United States Patent [19]

Takada

[11] Patent Number: 4,552,407
[45] Date of Patent: Nov. 12, 1985

[54] SEATBELT CLAMP

[76] Inventor: Juichiro Takada, 12-1, 3-chome Setagayaku, Tokyo, Japan

[21] Appl. No.: 513,173

[22] Filed: Jul. 13, 1983

[30] Foreign Application Priority Data

Jul. 20, 1982 [JP] Japan .............................. 57-108753[U]

[51] Int. Cl.$^4$ .......................... A62B 35/00; B60R 21/10
[52] U.S. Cl. ...................................... 297/476; 24/584; 280/806; 297/479; 297/480; 297/483
[58] Field of Search ............... 297/476, 478, 480, 479, 297/483; 280/806, 801, 808, 804; 24/68 R, 68 SB, 68 A, 584, 585, 586, 582, 581, 583, 580; 242/74.1, 74.2; 292/170, 159; 188/65.2, 65.1; 403/322, 321

[56] References Cited

U.S. PATENT DOCUMENTS

| | | | |
|---|---|---|---|
| 3,526,431 | 9/1970 | Boedigheimer et al. ............ | 297/479 |
| 3,847,434 | 11/1974 | Weman ................................ | 297/478 |
| 4,185,791 | 1/1980 | Takada .............................. | 297/476 X |
| 4,208,770 | 6/1980 | Takada .............................. | 297/476 X |

Primary Examiner—William E. Lyddane
Assistant Examiner—José V. Chen
Attorney, Agent, or Firm—Brumbaugh, Graves, Donohue & Raymond

[57] ABSTRACT

A seatbelt clamp for locking a seatbelt to restrain a vehicle occupant and prevent elongation of the seatbelt due to tightening of loops remaining on a seatbelt retractor is provided. The clamp comprises two operation plates, adjustable relative to each other, which are slidably mounted on a base plate. The base plate has a case on its lower end housing a fixed clamping jaw and a movable clamping jaw, the latter being biased by a spring into a non-clamping position. The two plates also are normally biased by a spring into a non-clamping position. If an emergency results, which throws the passenger against the seatbelt, causing the tension in the seatbelt to exceed a predetermined level of force, the two plates are urged against the biasing force, and a cam provided on the lower end of the lower operation plate drives the movable clamping jaw into the fixed jaw to clamp the seatbelt therebetween.

6 Claims, 3 Drawing Figures

SEATBELT CLAMP

BACKGROUND OF THE INVENTION

The present invention relates to seatbelt clamps and, in particular, to a seatbelt clamp mounted to a belt guide member of a passive restraint seatbelt system.

In many known vehicle passive restraint seatbelt systems, emergency locking retractors are employed which lock automatically in the event of an emergency to prevent the belt from unwinding. A disadvantage of some such systems is that they may permit a significant amount of elongation of the effective length of the belt in a collision by tightening of the loops that remain wound on the retractor, such loops usually being wound relatively loosely, following locking of the retractor.

SUMMARY OF THE INVENTION

Accordingly, it is an object of the present invention to provide a seatbelt clamp which fully locks the belt in an effective way to restrain the vehicle occupant and prevent the elongation of the belt due to the tightening of loops remaining on the retractor.

The seatbelt clamp in accordance with the present invention comprises a base plate, affixed to the vehicle body at a suitable location, having upper and lower operation plates slidably guided thereon between its two sides. The upper operation plate has a belt guide member mounted to it through which the seatbelt to be clamped passes, e.g., a shoulder belt of a three-point passive restraint belt system. The lower operation plate has a cam on its lower end, and a plurality of holes along its length. The upper and lower operation plates are coupled together by a locking mechanism carried on the upper operation plate that has a pin which is inserted into one of the holes in the lower operation plate. Thus, the relative position of the two plates can be adjusted to fit the belt to the particular passenger.

The lower operation plate (as well as the upper plate, carrying the belt guide coupled to it) is biased upwardly toward a non-clamping position by a spring, one end of which is supported in the base plate. The cam on the lower end of the lower operation plate is housed within a case on the lower end of the base plate, which also houses a fixed clamping jaw and a movable clamping jaw. The movable clamping jaw is guided along elongated holes in the sides of the case by pins provided on the sides of the jaw, and is normally biased toward a non-clamping position by a spring. The fixed clamping jaw is fixed on the wall opposite to the movable clamping jaw, and the seatbelt passes between the movable and fixed clamping jaws.

If an emergency causes the retractor to lock, the tension on the seatbelt, upon reaching a predetermined level (depending upon the spring characteristic of the spring urging the plates into the non-clamping position), due to the force on the belt as the vehicle occupant is thrown forward against the belt, causes the belt guide member, the two operation plates, and the cam to be pushed down against the biasing force of the spring. The cam, in turn, drives the movable clamping jaw into the fixed clamping jaw, thus clamping the belt between the fixed and movable clamping jaws.

BRIEF DESCRIPTION OF THE DRAWINGS

For a better understanding of the invention, reference may be made to the following description of exemplary embodiments, taken in conjunction with the figures of the accompanying drawings, in which.

DESCRIPTION OF EXEMPLARY EMBODIMENTS

Figure 1:
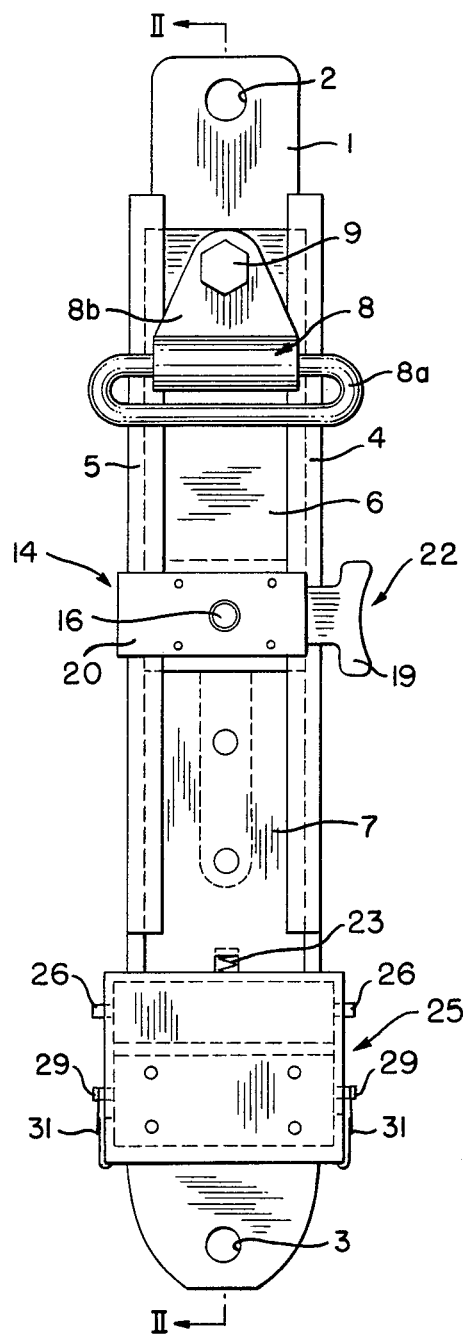
FIG. 1 is a front view of a seatbelt clamp in accordance with the present invention.
Figure 2:
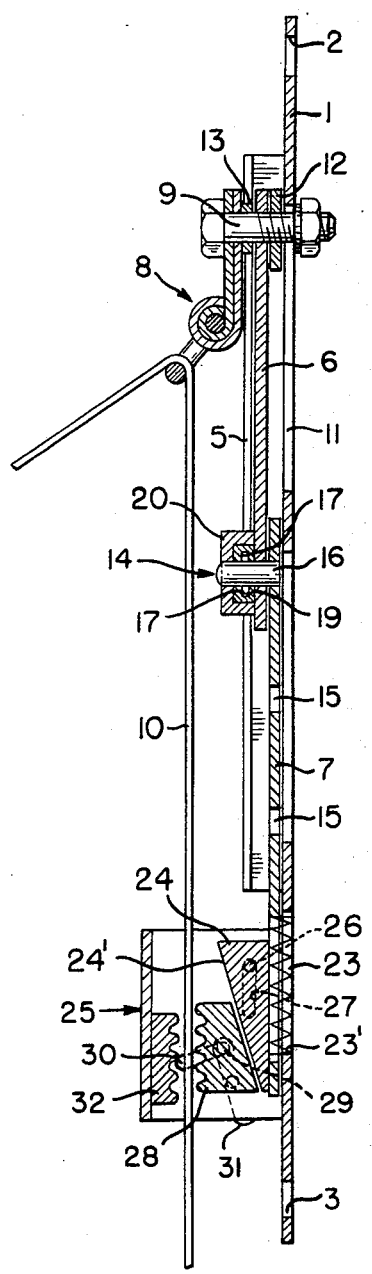
FIG. 2 is a cross-sectional view of the clamp, taken along the line II of FIG. 1.

With reference to FIGS. 1 and 2, a seatbelt clamp in accordance with the present invention comprises a base plate 1 affixed to the body of a vehicle by, e.g., attachment bolts (not illustrated), screwed through the holes 2 and 3 in the base plate. The base plate 1 has two sides 4 and 5 bent at about a right angle to the base plate proper in between which operation plates 6 and 7 are slidably guided. The lower operation plate has a plurality of holes 15, for a purpose to be described more fully below. A belt guide member 8 is rotatably mounted on the upper operation plate 6 by means of a bolt 9. This belt guide member 8 guides, for example, a shoulder belt 10 of a passive restraint belt system. In the illustrated embodiment, the guide member 8 comprises a ring 8a held in a plate 8b. The plate 8b is fixed on the upper operation plate 6 by a bolt 9 that passes through an elongated aperture 11 of the base plate 1 and has suitable spacers 13 and 12 to space the plate 8b from the operation plate 6 and the plate 6 from the base plate 1, respectively.

Figure 3:
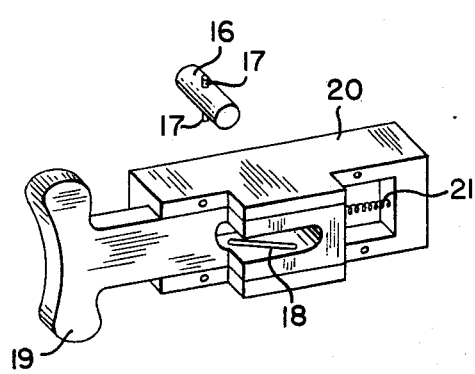
FIG. 3 is a partially exploded perspective view of the locking mechanism used to lock the upper and lower operation plates.

A locking mechanism 14 is provided for coupling the upper operation plate 6 and the lower operation plate 7. As seen more clearly in FIG. 3, this locking mechanism 14 comprises a pin 16 which is inserted into one of the holes 15 provided in the lower operation plate 7. Thus, the relative position of the two operation plates 6 and 7 can be adjusted to position the belt guide 8 to fit the belt to the particular passenger. The pin 16 has protrusions 17 that engage an oblique groove 18 formed in a slider member 19. A guide member 20 for the slider 19 is affixed to the lower end of the upper operation plate 6, and a spring 21 is positioned between the guide 20 and the slider member 19 to bias the slider 19 toward a locking position.

When the slider member 19 is pushed in a direction indicated by an arrow 22 (FIG. 1) against the spring 21, the pin 16 is pushed out of the hole 15 by way of the protrusions 17 engaging the oblique groove 18, thereby releasing the coupling between the upper operation plate 6 and the lower operation plate 7. The operation plate 6 is thus free to slide relative to the base plate 1 until the pin 16 reaches another hole 15. Thereafter, the slider member 19 is released and slides within the guide 20 due to the force of the spring 21, the pin 16 moving along the oblique groove 18 by way of the protrusion 17 until it is inserted into another hole 15, whereby the upper operation plate 6 and the lower operation plate 7 are again coupled to each other.

The lower operation plate 7 is biased upwardly toward a non-clamping position by a spring 23 having one end 23' supported by the base plate 1. A cam 24 having an inclined surface 24' is affixed to the lower end of the lower operation plate 7 and is housed in a case 25 affixed to the base plate 1. The cam 24 is guided along an elongated slot 27 formed in the sides of the case 25 by means of a pin 26 attached to both sides of the case 25.

A movable clamping jaw 28, which contacts the inclined plane 24' of the cam 24, is guided along elongated holes 30 in the sides of the case 25 by means of a pin 29 attached to both sides of the movable clamping jaw 28, and is biased toward the base plate 1, toward a non-clamping position, by means of a spring 31. A fixed clamping jaw 32 is fixed in the case 25 opposite the movable clamping jaw 28. The seatbelt 10 leads from the belt guide member 8 between the movable clamping jaw 28 and the fixed clamping jaw 32, and is fixed to a seatbelt retractor (not illustrated).

In the event of an emergency causing the belt retractor to lock, the tension load of the seatbelt 10, upon reaching a predetermined level (depending upon the spring characteristic of the spring 23) due to the force on the belt as the vehicle occupant is thrown forward against the belt, causes the belt guide member 8, the operation plates 6 and 7 and the cam 24 to be pushed down against the biasing force of the spring 23. The cam 24, in turn, drives the movable clamping jaw 28 toward the fixed clamping jaw 32, thus clamping the seatbelt 10 between the movable and the fixed clamping jaws 28 and 32, respectively.

As an alternative embodiment, a simpler construction can be obtained by providing a lower operation plate 7 having a cam integrally formed therewith. Furthermore, the coupling between the upper operation plate 6 and the lower operation plate 7, the linking construction of the belt guide member 8 and the cam 24, and the height adjusting mechanism of the belt guide member can all be modified. For example, a spindle can be rotatably mounted to the cam 24 with the movement along the shaft prevented. A spindle nut can be attached to the belt guide member 8. The spindle can be rotated by a motor affixed to the cam so that when the motor is energized to rotate the spindle, the spindle nut moves upwardly or downwardly, thereby adjusting the height of the belt guide member.

As described above, the seatbelt clamp according to the present invention includes a first clamping jaw affixed to a base plate, a second clamping jaw positioned opposite to the first clamping jaw and spring biased in a direction away from the first clamping jaw, a cam moving the second clamping jaw toward the first clamping jaw, and a belt guide member coupled to the cam and slidably and rotatably supported by the base plate. The belt is clamped between the movable and fixed clamping jaws, which prevents, by actuation of the cam upon exertion of a predetermined tension load on the belt, the tightening of loosely wound loops of belt wound on the belt retractor. As a result, the occupant restraining performance of a passive restraint belt system employing the present invention is improved. Furthermore, the arrangement of a rotatable belt guide member in the seatbelt clamp enables the seatbelt to be guided and applied to the occupant more effectively. The vertical position of the belt guide member 8 can be adjusted by suitable positioning of the two operation plates 6 and 7 so that the seatbelt can be guided and applied to the occupant more accurately depending on the needs of the particular occupant or vehicle.

It will be appreciated by those skilled in the art that other variations and modifications may be made without departing from the spirit of the inventive concepts disclosed herein. All such variations and modifications are intended to fall within the scope of the appended claims.

I claim:

1. A clamping device for clamping a seatbelt of a passive restraint belt system comprising an elongated base plate affixed to a vehicle body and having a case at a lower end thereof, an elongated operating member slidably mounted lengthwise of the base plate and having a belt guide means affixed adjacent an upper end thereof and a cam means affixed at a lower end thereof, a movable clamping jaw in the case having a surface engageable with the cam means, a fixed clamping jaw arranged on a wall of the case opposite to the movable clamping jaw, the seatbelt passing through a space defined between the movable jaw and the fixed jaw, and wrapping at least partway around the belt guide means and a spring biasing the operating member and its cam away from the movable clamping jaw toward a non-clamping position, whereby when a predetermined force is exerted on the seatbelt, the biasing force of the spring is overcome and the operating member is moved toward a clamping position to cause the cam to engage the movable clamping jaw, thereby forcing the movable clamping jaw against the fixed clamping jaw, to clamp the seatbelt between the fixed and the movable clamping jaws.

2. The clamping device according to claim 1, wherein the elongated operating member comprises an upper operation plate and a lower operation plate, the belt guide means being mounted on the upper operation plate and the cam means being provided on the lower operation plate, and further comprising coupling means for connecting the upper and lower operation plates in any one of a plurality of positions relative to each other.

3. The clamping device according to claim 2, wherein the lower operation plate has a plurality of holes into which a pin in the coupling means engages to couple the upper and lower operation plates to each other in one of the plurality of positions.

4. The clamping device according to claim 3, wherein the coupling means comprises a guide member fixed on the upper operation plate in which a slider member is slidably received, the slider member being urged toward a locking position by a spring means, the coupling means further comprising a pin having protrusions that engage oblique grooves in the slider member, whereby when the slider member is urged against the spring means the pin is withdrawn from a hole in the lower operation plate so that the relative positions of the operation plates can be adjusted.

5. The clamping device according to claim 1, wherein a spring means is provided for biasing the movable clamping jaw toward the non-clamping position.

6. The clamping device according to claim 5, wherein the movable clamping jaw comprises a pin on each side of the jaw which is received in an elongated slot in the sides of the case, the pins and the elongated slots guiding the movable clamping jaw between the non-clamping and the clamping positions.

* * * * *